J. E. HODGES.
CLAMP.
APPLICATION FILED OCT. 15, 1915.
1,291,519.                                        Patented Jan. 14, 1919.
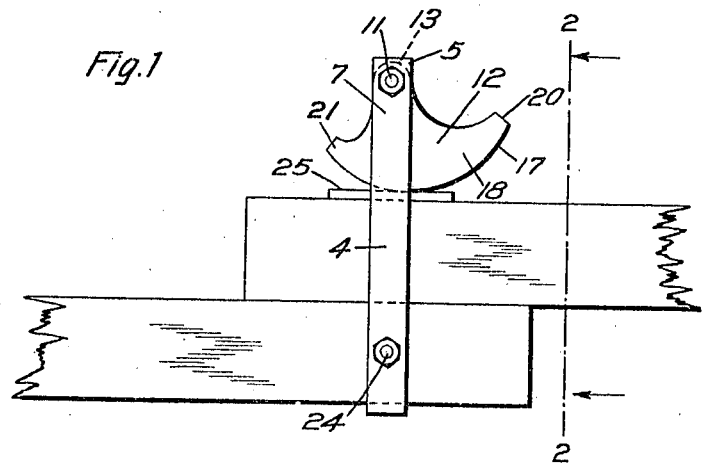
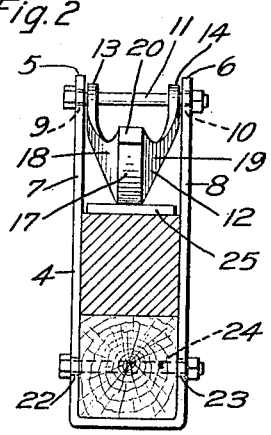
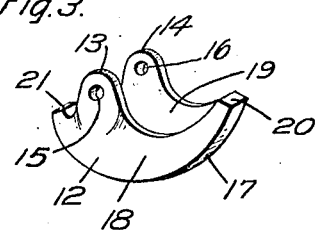
Witnesses:                                        Inventor.
                                            Jesse E. Hodges
                                        By
                                            Walter F. Murray
                                                Attorney.

UNITED STATES PATENT OFFICE.

JESSE E. HODGES, OF COVINGTON, KENTUCKY.

CLAMP.

1,291,519.	Specification of Letters Patent.	Patented Jan. 14, 1919.

Application filed October 15, 1915. Serial No. 56,118.

*To all whom it may concern:*

Be it known that I, JESSE E. HODGES, a citizen of the United States of America, and resident of Covington, Kentucky, have invented certain new and useful Improvements in Clamps, of which the following is a specification.

This invention relates to an improved clamp for construction work and has for an object to produce a clamp which will frictionally unite timbers used in forming bracing, shoring, etc., in adjusted positions.

A further object is to produce a clamp which is simple, compact, cheap and efficient.

These and other objects are attained in the clamp described in the following specification and illustrated in the accompanying drawings in which:

Figure 1 is a side elevation of the clamp embodying my invention, showing the manner of employing the clamp in connecting two timbers in adjusted positions for forming temporary braces for the sides of ditches, walls, etc.

Fig. 2 is a sectional view taken on the line 2—2 of Fig. 1.

Fig. 3 is a perspective view of a clamp dog forming a detail of the clamp embodying my invention.

The clamp embodying my invention consists of a U-shaped metal strap 4 adapted to embrace the timbers to be held together. At the upper ends 5 and 6 of the legs 7 and 8 of the strap, are alined apertures 9 and 10 adapted to receive the transversely extending bolt 11. This bolt forms a journal pin for the clamp dog 12. This clamp dog is provided with lugs 13 and 14 having apertures 15 and 16 for rotatively mounting the dog on the bolt 11, and is provided with a smooth friction clamping surface 17 which is eccentric to the pivotal center of the dog. The eccentric surface 17 is connected with the lugs 13 and 14 of the dog by sides or flanges 18 and 19 which extend from the surface 17 and consequently strengthen the surface and at the same time provide a light hollow structure. The lugs 13 and 14 are preferably spaced apart a distance substantially equal to the distance between the legs 7 and 8 of the strap 4, and thereby hold the clamp dog centrally of the strap so that the surface 17 will engage the center of the object located in the strap. In addition to this the spread position of the lugs with the eccentric surface located between them renders the dog substantial so that it will not wabble. The dog is provided at its end of greatest eccentricity with the flat surface 20 which is provided for the purpose of affording a driving surface against which blows may be directed in driving the dog into engagement with the object located in the strap. The opposite end 21 of the dog is shaped similarly to the end 20 so that the dog may be driven out of engagement with the surface of the object by directing blows upon the end 21. The clamp strap is provided with apertures 22 and 23 adjacent to its base for the purpose of receiving a bolt or pin 24 to secure the strap to one of the timbers to be clamped together, as shown in Figs. 1 and 2. Before driving the eccentric surface 17 into clamping engagement with the object located between the branches of the strap, a plate 25 is located in position to be engaged by the surface 17 so that the pressure of this relatively narrow surface will be brought to bear more uniformly upon the surface of the timber engaged by the dog, without wearing into the timber and thereby detrimentally affecting the smooth operation of the dog. The surface of the plate as well as the surface 17 are made smooth, thus permitting the two surfaces to slide easily over one another and thereby facilitating the operation of driving the dog into clamping engagement with the plate. The plate may be provided with apertures to receive nails for securing it to the surface of the timber upon which it is located, in order to prevent its displacement when the clamp dog is driven into engagement therewith, if so desired.

In other clamps heretofore employed, in which eccentric clamp dogs are provided, handles are formed on the dogs, so that they may be operated manually. In such constructions the handle protrudes in an objectionable manner and is consequently in danger of being accidentally knocked and thereby causing the releasing of the clamp at inopportune times with the danger of disastrous results occurring therefrom. These handled clamp dogs furthermore require a greater length of time to properly set the clamps and cannot be as securely fastened as dogs having flat hammering surface for receiving blows for driving them into engagement with the work to be clamped as in my improved construction.

Other clamps employing clamp dogs of the eccentric type have their faces roughened to produce a biting grip upon the work with which they are driven into engagement. Such clamps are primarily intended for use in brace or strut structures in which relative movement of the members is depended upon for securing clamping movement of the clamp dog. In these roughened or corrugated surfaced dogs the rough surfaces oppose the movement of the dog as it is being driven into clamping engagement and thus prevent a firm clamping of the parts together, and permitting sidewise movement thereof.

In applicant's improved clamp the relative movement of the members is not at all depended upon for securing clamping pressure of the clamp dog, but instead the eccentric surface is made smooth so that the clamp dog may be driven into more intimate engagement with the members to be clamped in order to frictionally lock them together, and so that the clamping movement of the dog will be more finely adjusted because of the smooth coöperating surfaces of the clamp and the plate against which the eccentric surface of the clamp dog operates. In order to increase or decrease the tension exerted by the clamp a slight blow from a hammer directed upon either of the faces 20 or 21 will adjust the dog properly.

Although I have described my improved clamp as being employed in clamping together timbers for bracing the sides of ditches, supporting form work, scaffolding, etc., it may also be employed for any other purposes to which a clamp of the type set forth may be adapted.

Having thus described my invention, what I claim is:

1. In a clamp the combination of a U-shaped strap having its legs adapted to extend beyond the outer sides of the objects to be clamped and terminating in alinement with the plane of said sides, a pin extending from one end to the opposite end of the strap and secured thereto, and a clamp dog, said clamp dog having lugs formed thereon, spaced apart a distance equal to the distance between the legs of the strap and adapted to receive the pin to mount the dog pivotally on the strap, and a clamping surface located between the lugs and formed eccentric to the pivot pin, said surface being connected with said lugs by flanges extending at angles to the legs of the strap, and having hammering surfaces at each end of the eccentric clamping surface.

2. In a clamp the combination of a U-shaped strap having its legs adapted to extend beyond the outer sides of the objects to be clamped and terminating in alinement with the plane of said sides, a pin extending from one end to the opposite end of the strap and secured thereto, and a clamp dog, said clamp dog having lugs formed thereon, spaced apart a distance equal to the distance between the legs of the strap and adapted to receive the pin and mount the dog pivotally on the strap, and a clamping surface located between the lugs and formed eccentric to the pivot pin, said surface being connected with said lugs by flanges extending at angles to the legs of the strap, having hammering surfaces at each end thereof and having consecutive points therein at increasing distances from the axis of the pivot pin.

In testimony whereof, I have hereunto subscribed my name this 12th day of October, 1915.

JESSE E. HODGES.

Witnesses:
WALTER F. MURRAY,
EDWARD O. KEATOR.

Copies of this patent may be obtained for five cents each, by addressing the "Commissioner of Patents, Washington, D. C."